United States Patent [19]

Kemp

[11] Patent Number: 5,000,492

[45] Date of Patent: * Mar. 19, 1991

[54] FLANGED CONNECTION FOR FLOW LINE MEMBERS

[75] Inventor: Willard E. Kemp, Houston, Tex.

[73] Assignee: Kemp Development Corporation, Houston, Tex.

[*] Notice: The portion of the term of this patent subsequent to Apr. 24, 2007 has been disclaimed.

[21] Appl. No.: 471,622

[22] Filed: Jan. 24, 1990

Related U.S. Application Data

[63] Continuation of Ser. No. 264,384, Oct. 31, 1988, Pat. No. 4,919,391.

[51] Int. Cl.$^5$ ............................................. F16L 23/00
[52] U.S. Cl. .................................... 285/363; 285/414; 29/469; 29/525
[58] Field of Search ............... 285/414, 405, 412, 363, 285/368; 29/525, 469; 251/148

[56] References Cited

U.S. PATENT DOCUMENTS

| | | | |
|---|---|---|---|
| 666,175 | 1/1901 | Batcheller . | |
| 1,004,270 | 9/1911 | Jahnke . | |
| 2,211,983 | 8/1940 | Parris . | |
| 2,568,414 | 9/1951 | Russ . | |
| 4,252,346 | 2/1981 | Sundholm . | |
| 4,919,391 | 4/1990 | Kemp | 285/405 X |

FOREIGN PATENT DOCUMENTS

14188 of 1895 United Kingdom .

OTHER PUBLICATIONS

Dwg. No. 8B0111 dated 9-2-88; "Superalloy Titanium Ball Valves—Description and Features"; Kemp Development Corporation.

Primary Examiner—Dave W. Arola
Attorney, Agent, or Firm—Dodge Bush & Moseley

[57] ABSTRACT

A connection for connecting an end hub (22) of a valve (10) to the flange (32) of an associated conduit (26). A bolting ring (36) has a threaded end portion (64) adjacent the valve (10), and a cylindrical smooth end portion (68) remote from the valve (10) extending radially inwardly from the threaded end portion (64). A shoulder (70) between the smooth portion (68) of the ring (36) and the threaded portion (64) acts as a stop to accurately position the bolting ring (36) onto the hub (22). Upon connection of the assembled valve structure to adjacent conduits (26), tensioning of the threaded studs (42) results in torque loads exerted by the smooth surface (68) on the locking ring (36) against the smooth surface (60) on the hub (22) for transmitting loads to the hub (22) as shown particularly in FIG. 5. The method includes the positioning of the locking ring (36) onto the hub (22) with mating cylindrical threads (64, 46) first being engaged and then adjacent smooth portions (60, 68) being engaged in a slight interference fit for subsequent connection of the valve (10) to conduits (26) by tensioning of the connecting studs (42).

8 Claims, 2 Drawing Sheets

FLANGED CONNECTION FOR FLOW LINE MEMBERS

This application is a continuation of application Ser. No. 264,384, filed Oct. 31, 1988, now U.S. Pat. No. 4,919,391.

BACKGROUND OF THE INVENTION

This invention relates to an improved means and method for connecting valves and the like to adjacent conduits, and more particularly to such improved means and methods utilizing a separate bolting ring threaded onto an end hub of the valve for connecting the valve to the conduit.

Heretofore, such as illustrated in FIG. 1A herein, a separate bolting ring has been utilized for connecting an end hub of a valve to a flow line or conduit. However, with such an arrangement, it has been difficult to obtain precise and accurate positioning of the ring onto the hub. Further, upon relative high torques exerted by higher excessive bolting forces against the bolting ring, the thread area adjacent the flow line is placed under an undesirable compressive loading.

One possible solution to the precise positioning of a bolting ring on the externally threaded hub has involved the use of interference threads on the hub and bolting ring. However, this has tended to be unsatisfactory as it is difficult to install a bolting ring with an interference thread, and if the bolting ring is heated and then inaccurately positioned on the hub, the ring is fixed at that location unless removed by difficult procedures.

Also, if the threaded connection is slightly loose after heating of the bolting ring, and subsequent cooling, the bolting ring may rotationally deform under subsequent excessive bolting torques.

SUMMARY OF THE INVENTION

The present invention is directed to an improved means and method for connecting a valve hub to an associated flow line or conduit utilizing a separate bolting ring threaded onto an externally threaded valve hub. The separate bolting ring has a central bore therethrough defined by a threaded end portion adjacent the valve, and an opposed smooth end portion adjacent the associated conduit extending radially inwardly of the threaded end portion. The valve hub has a mating externally threaded end portion and an adjacent mating smooth end portion recessed radially inwardly of the externally threaded end portion. The smooth end portions of the valve hub and bolting ring define facing shoulders extending at right angles to the smooth portions and contacting each other during assembly of the bolting ring onto the hub for accurate positioning of the bolting ring.

Upon assembly of the bolting ring onto the valve hub with straight cylindrical mating threads, the mating threads first engage and after rotation of the bolting ring around one turn, the adjacent smooth surfaces of the hub and bolting ring preferably engage each other in a slight interference fit after being guided by the mating screw threads. Upon the positioning of the stud and nut combination within axially aligned openings of the bolting ring and adjacent conduit flange, the nuts are tightened to draw the bolting ring and conduit flange together. The tightening of the nuts results in a torque force erected against the bolting ring to produce a generally uniform peripheral force about the contacting surfaces of the hub and bolting ring to provide an increased interference fit between the smooth surfaces while relieving the threaded fit at the end of the bolting ring adjacent the valve. Such an arrangement permits a simplified assembly of a separate bolting ring having a relatively high yield strength onto an externally threaded valve hub having a relatively low yield strength by engagement of smooth mating cylindrically surfaces on the hub and ring while utilizing straight cylindrical mating threads thereby minimizing damage or overstressing of the thread connection. Further, contacting shoulders formed adjacent the mating smooth portions permit accurate positioning of the bolting ring onto the valve hub.

In addition, the high bolting torque resulting from tensioning the studs is transmitted by the smooth surfaces to the valve hub thereby minimizing stressing of the threaded connection.

It is an object of this invention to provide an improved means and method for connecting valves to adjacent conduits utilizing a separate bolting ring threaded onto an externally threaded end hub of the valve.

A further object of the invention is to provide such an improved means and method in which the bolting ring and associated valve hub are formed with mating screw threads which are initially engaged and with adjacent mating stepped smooth surface portions at the ends thereof remote from the valve which transfer high bolting torques to the valve hub thereby minimizing stressing of the threaded connection.

A further object of the invention is to provide such improved means and method in which the bolting ring may be precisely positioned on the externally threaded valve hub at a predetermined precise position without any undue stressing of the mating threads on the bolting ring and valve hub.

An additional object is to provide a connection for a bolting ring and valve hub utilizing mating cylindrical smooth portions adjacent the ends thereof remote from the valve, and mating straight cylindrical threaded portions at the ends thereof adjacent the valve which are engaged upon assembly prior to engagement of the mating smooth portions.

Other objects, features, and advantages of the invention will become more apparent after referring to the following specification and drawings.

DESCRIPTION OF THE INVENTION

Figure 3:
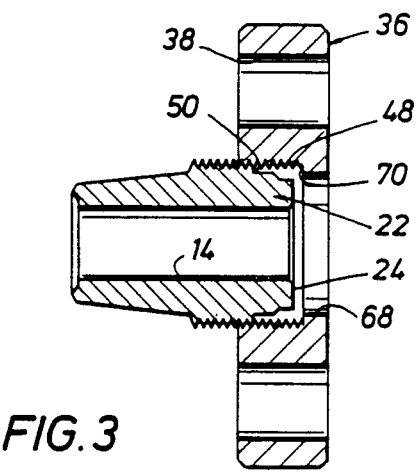
FIG. 3 is a sectional view showing the bolting ring partially threaded on to the valve hub during assembly of the connection.
Figure 4:
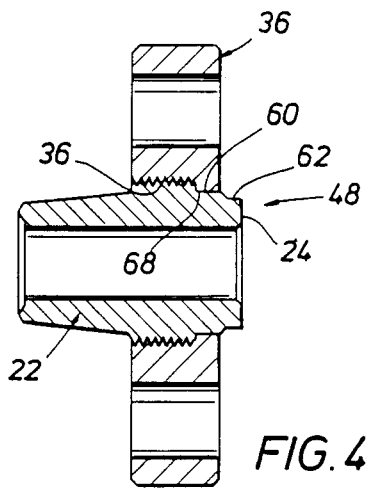
Figure 5:
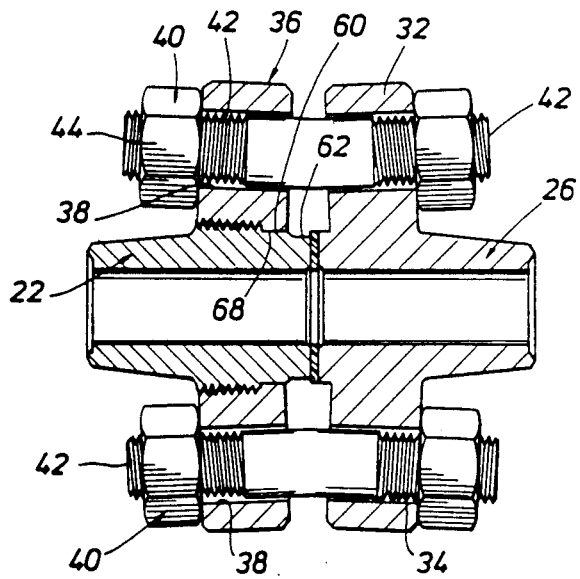

FIG. 4 is a sectional view similar to FIG. 3 but showing the bolting ring in assembled position on the valve hub; and FIG. 5 is a sectional view of the assembled bolting ring and valve hub illustrating in exaggerated relation the torque exerted upon tensioning of the connecting studs with a compressive peripheral force therefrom being exerted against the smooth contacting surfaces of the bolting ring and valve hub.

Figure 1:
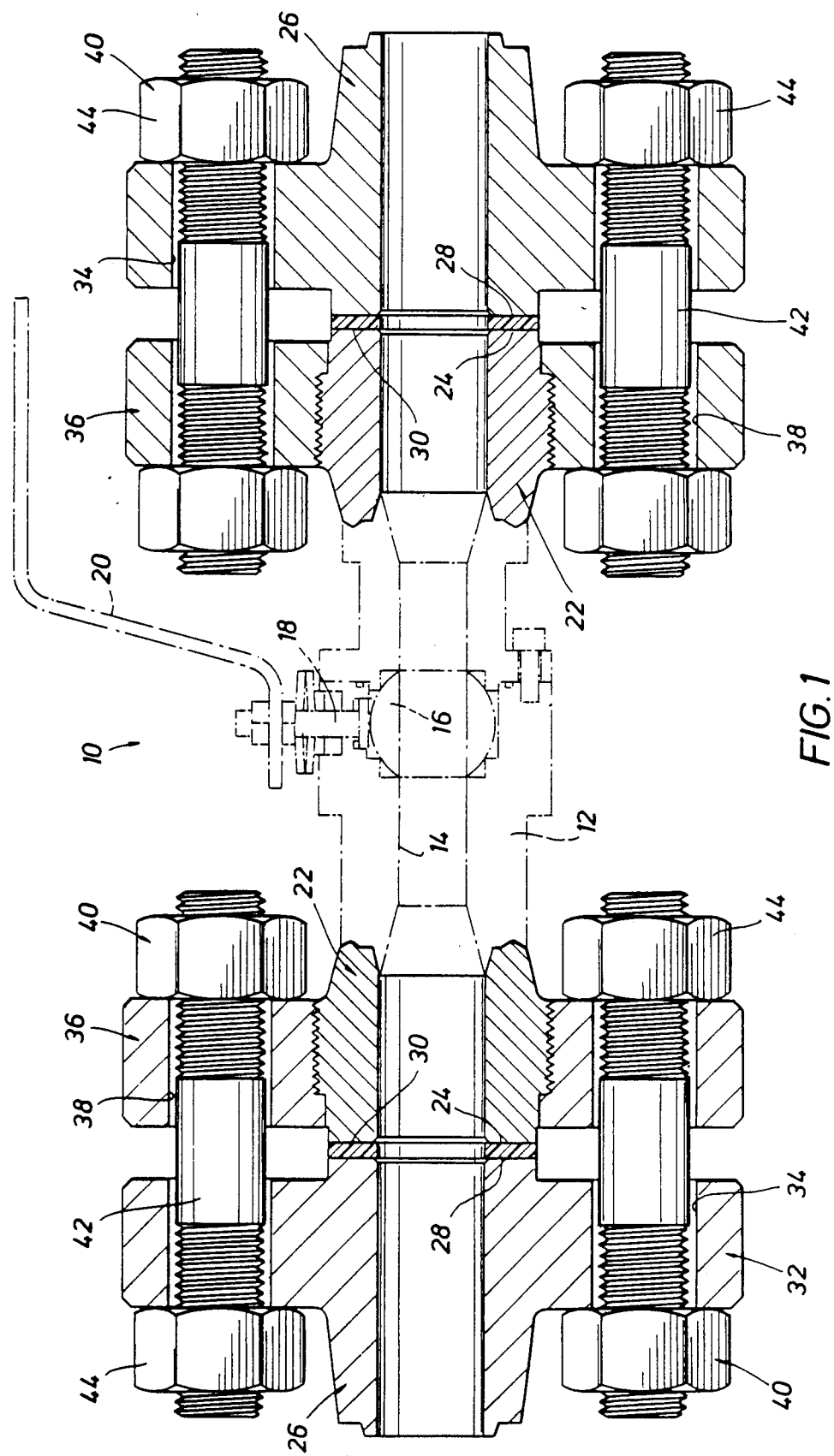
FIG. 1 is a longitudinal sectional view of a valve connected to opposed conduits by the threaded bolting rings and valve hubs forming the present invention.

Referring now to the drawings for a better understanding of this invention and more particularly to FIG. 1, a valve is shown generally at 10 forming a flow line member having a valve body shown generally at 12 with a fluid passage 14 therethrough. A ball valve member shown at 1& is mounted for movement between open and closed positions relative to fluid passage 14. A stem 18 has a handle 20 connected thereto for rotating ball valve member is between open and closed positions as well known in the art.

Valve body 12 has opposed end hubs indicated generally at 22 thereon defining annular end faces 24. Opposed conduits or flow line members 26 are connected to valve 10 and have annular end faces 28 in opposed relation to end faces 24 of valve hubs 22. Annular gaskets 30 are positioned between annular end faces 24 and 28 for providing a fluid tight seal between faces 24 and 28. End flanges 32 on conduits 26 have a plurality of openings 34 equally spaced about flange 32.

For connecting conduits 26 in abutting relation to end hub 22, and forming an important part of this invention, a bolting ring is shown generally at 36 for each end hub 22. Openings 38 in bolting ring 36 are positioned to be in axial alignment with openings 34 of flange 32 on the associated conduit 26. Suitable stud and nut combination indicated generally at 40 comprising threaded studs or pins and nuts 44 are received within aligned opening 34,38 and upon tightening, gasket 30 forms a fluid tight sealing relation with end faces 24,28.

Figure 2:
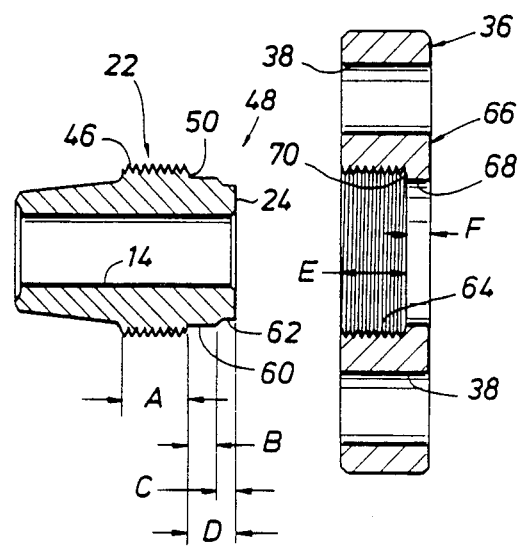
FIG. 2 is an exploded view showing the bolting ring removed from the valve hub of FIG. 1.

Referring now to FIG. 2, end hub 22 has an externally threaded inner end portion 46 defining the inner end adjacent valve 16, and an outer end portion 48 defining a smooth cylindrical surface adjacent the outer end of hub 22 remote from valve 16. Smooth cylindrical surface 48 is recessed radially inwardly from the screw threads on end portion 46 and defines an annular shoulder 50 formed between the screw threads of end portion 46 and smooth portion 48. Smooth end portion 48 has an inner smooth section 60 which is adapted to contact bolting ring 36 in a similar relation and an adjacent smooth section 62 which is recessed radially inwardly from smooth section 60 and extends outwardly from locking ring 36 in assembled relation as will be explained further. The diameter of smooth section 62 may be smaller than that of smooth section 60 by a small amount, and in particular it will be slightly smaller than smooth portion 68 on bolting ring 36. In FIG. 2 the difference in diameters between smooth sections 60 and 62 have been exaggerated to a great degree, whereas in practice the difference will only be a few thousandths of an inch. The width of threaded end portion 46 is shown at A and the width of smooth cylindrical end portion 48 is shown as D. The inner end smooth section 60 has a width shown at B while the outer smooth end section 62 has a width shown at C.

Bolting ring 36 has a central bore therethrough defined by an inner threaded end portion 64 adjacent valve member 16 and a flange 66 on the opposite end of bolting ring 36 which extends radially inwardly of threaded end portion 64. Flange 66 forms a smooth cylindrical end portion 68 and a shoulder 70 extending at right angles to smooth surface 68 joins threaded portion 64 and smooth surface portion 68.

Referring now particularly to FIG. 2, the width of threaded end portion 64 is shown at E and the width of cylindrical smooth portion 68 is shown at F. For best results, width F is around 25% of width E but satisfactory results may be obtained with width F being between around 15% and 45% of width E dependent on such factors as the entire thickness of bolting ring 36. Width F is of a minimum of one-eighth inch ($\frac{1}{8}$") and as high as around one-half inch ($\frac{1}{2}$") with the thickness of bolting ring 36 being around two inches.

For ease of assembly, the relationships between dimensions A, B, C and n on the hub and dimension E and F of the bolting ring should be such that width A and width E should be approximately the same, and the width E should be greater than width B by at least the width of one thread turn, so that upon assembling ring 36 onto hub 14 the thread is fully engaged prior to the interfering smooth sections 60 and 68 coming into engagement.

For assembly of bolting ring 36 onto hub 22, the following step are employed. First, the straight cylindrical threads of bolting ring 36 and hub 22 are engaged and ring 36 is rotated at least around one turn onto hub 22 and preferably several turns. Then, upon further rotation of ring 36, smooth surfaces 60 and 68 engage as shown in FIG. 3 with bolting ring 36 being rotated thereon until shoulder 50 contacts shoulder 70. Ring 36 will turn freely on hub 22 so long as only threaded portions 36 and 46 are engaged, and will turn with more difficulty when interfering portions 60 and 68 become engaged. If ring 36 is heated while hub 22 remains cool, then ring 36 may be fully engaged with relative ease. When both hub 22 and ring 36 reach the same temperature, there will be a degree of interference between smooth surfaces 60 and 68, which will provide a smooth contact for the uniform flow of forces between ring 36 and hub 22 as well as sufficient friction to prevent inadvertent rotation of ring 36 relative to hub 22. After contact of shoulders 50 and 70, bolting ring 36 is rotated in a reverse direction a relatively small amount, such as around between 5° and 25° of rotation, to position openings 38 at the proper position relative to openings 34 of flange 32 which have been positioned at precise predetermined locations. Thus, shoulders 50 and 70 are utilized to accurately position bolting ring 36 relative to hub 22 and flange 32. Smooth surface 60 is received within smooth surface 68 with a slight interference fit upon threading of bolting ring 36 onto hub 22. In this relation, valve 10 may be shipped to a location where the valve is connected to flanges 32 of conduits 26 with the stud and bolt combinations 40. Upon installation of valve 10 within a flow line defined by conduits 26, openings 38 are aligned with openings 34 in flanges 32 of the conduit 26. Then, stud and nut combinations 40 are inserted and nuts 44 are tightened to tension threaded studs or pins 42. As shown in FIG. 5 in an exaggerated relation, the tensioning of studs 42 effects a torque and the inner end of bolting ring 36 is urged inwardly to exert a compressive peripheral loading of smooth surface 68 against smooth surface 60. As a result, opposed outer end of bolting ring 36 tends to be urged away from hub 22. Thus, the loading resulting from tensioning of studs 42 is transmitted to the hub 22 and the screw threads along surfaces 46 and 64 are not overstressed.

As a result of the improved connection, end hub 22 may be formed of a steel material less than around 35,000 psi yield strength while bolting ring 36 may be formed of a steel around 45,000 psi yield strength or greater. A relatively low strength material may be utilized for hub 22 as the threaded connection between locking ring 36 and threaded hub 22 is not unduly stressed and any undesirable torque loads are transmitted primarily through the contacting smooth surfaces 62 and 68 to hub 22.

It is pointed out that the threaded connection between hub 22 and ring 36 is outside any wetted surface or lading within fluid passage 14. Further, no additional connections are required between valve member 16 and hub 22 as a result of the present invention.

Figure 1A:
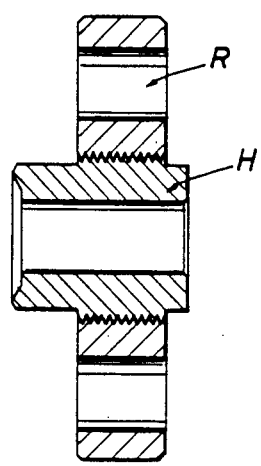
FIG. 1A is an example of the Prior art illustrating a bolting ring threaded onto an externally threaded valve hub.

Referring to FIG 1A, an example of the prior art is illustrated in which a bolting ring shown generally at R is threaded onto an externally threaded valve hub H. It is noted that there is no means for accurately positioning or locating locking ring R on hub H. Further, any torque loading resulting from tensioning of the nut and bolt combinations would be exerted against the threaded connection between hub H and ring R thus possibly resulting in an over-stressing of the threaded connection.

As a preferred embodiment of the present invention has been illustrated, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. An improved connection for connecting in end to end relation an end hub of one flow line member to a second adjacent flow line member having a flange thereon thereby to provide a continuous flow passage; said improved connection comprising:

an annular ring having a central opening therethrough defining an inner circular surface, said inner circular surface having an end portion thereof remote from said second flow member flange formed with internal screw threads and an opposed end portion thereof adjacent said second flow member flange formed with an inwardly extending flange projecting radially inwardly beyond said threaded end portion and exposed to the exterior of said hub, said inwardly extending flange defining an annular shoulder facing in a direction opposite said second flow member flange and a smooth inner surface at right angles to said shoulder;

said hub of said one flow line member having an end portion thereof remote from said second flow member flange formed with external screw threads in mating threaded engagement with the internal screw threads of said annular ring and an opposed end portion adjacent said second flow member flange defining a smooth outer surface recessed radially inwardly of the adjacent threaded end portion, said inwardly recessed end portion defining an annular shoulder in opposed facing relation to said ring shoulder and adapted to abut said ring shoulder for selectively positioning said ring relative to said hub, said ring and said second flow member flange having axially aligned openings therethrough; and fasteners received within said aligned openings for connecting said ring and said second flow member flange to each other with said hub being in aligned end to end relation with said second flow line member.

2. The improved connection of claim 1 wherein said hub and said annular ring are formed of different metal materials, the metal material of said annular ring having a yield strength greater than the yield strength of the metal material of said hub.

3. The improved connection of claim 1 wherein said smooth inner surface on said flange of said ring and said smooth outer surface of said end hub are at least around ⅛ inch in width and in a mating interference fit with each other in assembled position, the width of said threaded end portion of said ring being greater than the width of said smooth outer surface on said end hub whereby upon assembly the mating screws threads engage each other prior to engagement of the mating smooth surfaces.

4. The improved connection of claim 3 whereby upon an increase in the tightening force of said fasteners said smooth inner surface of said ring contacts said smooth outer surface of said end hub with an increased interference force transmitted to said end hub.

5. The improved connection of claim 1 wherein sealing means are provided between said end hub and said second flow line member about the flow passage for preventing fluid leakage thereat.

6. A method of connecting in end to end relation an externally threaded end hub of one flow line member to a second adjacent flow line member having a flange thereon thereby to provide a continuous flow passage; said method including the following steps:

forming said externally threaded end hub of said one flow line member with a radially inwardly recessed smooth portion adjacent the end of said hub;

providing a bolting ring for said hub having a central opening with a mating internally threaded end portion remote from said second flow member flange and a mating adjacent opposed smooth end portion adjacent said second flow member flange projecting radially inwardly with respect to said internally threaded end portion and exposed externally said hub, said recessed smooth portion on said hub and said smooth end portion on said ring defining adjacent shoulders extending at right angles to said smooth portions and adapted to contact each other upon assembly;

providing openings in said bolting ring and said second flow member flange adapted to be aligned axially for connection of said hub and said second flow line member;

initially threading said bolting ring onto the externally threaded end hub from the adjacent end of said one flow line member with the threaded end portions of said ring and hub first engaging each other and rotated in threaded relation at least around one turn prior to engagement of the adjacent smooth portions on said ring and hub;

then further threading said ring onto the hub with said smooth portions on said ring and hub then engaging and the shoulder on said ring contacting the shoulder on said hub for accurately positioning said ring relative to said hub for axial alignment of said openings in said bolting ring with said second flange; and providing fasteners received within said aligned openings for tightly connecting said hub to said second flow line member in end to end relation.

7. The method of claim 6 further including the step of fitting the smooth portions of said hub and said ring together in a predetermined interference fit upon threading of said end ring onto said hub, the increased tightening of said fasteners resulting in an increased interference force between said smooth portions of said hub and said ring.

8. The method of claim 6 further including the urging of mating screw threads of said ring and said hub away from each other at the inner ends thereof adjacent said valve upon an increase in the tensional forces exerted from the increased tightening of said fasteners.

* * * * *